United States Patent [19]
Tangren

[11] Patent Number: 5,850,319
[45] Date of Patent: Dec. 15, 1998

[54] HEAD SUSPENSION FOR USE WITH A DYNAMIC STORAGE DRIVE HAVING AN OPTIMIZED TOP PROFILE DEFINED BY CURVED SIDE EDGES

[75] Inventor: John H. Tangren, St. Paul, Minn.

[73] Assignee: Hutchinson Technology Incorporated, Hutchinson, Minn.

[21] Appl. No.: 828,296

[22] Filed: Mar. 28, 1997

[51] Int. Cl.$^6$ ...................................................... G11B 5/48
[52] U.S. Cl. ............................................................ 360/104
[58] Field of Search ............................................. 360/104

[56] References Cited

U.S. PATENT DOCUMENTS

| | | | |
|---|---|---|---|
| 5,187,625 | 2/1993 | Blaeser | 360/104 |
| 5,532,889 | 7/1996 | Stefansky | 360/104 |
| 5,572,387 | 11/1996 | Brooks | 360/104 |
| 5,617,274 | 4/1997 | Ruiz | 360/104 |
| 5,650,894 | 7/1997 | Ikeda | 360/104 |

*Primary Examiner*—A. J. Heinz
*Attorney, Agent, or Firm*—Faegre & Benson LLP

[57] ABSTRACT

A load beam for a head suspension has high lateral and torsional stiffness across the entire length of the load beam to assure high lateral bending and torsional resonance frequencies. The load beam utilizes an optimized top profile for distributing mass transversely of the load beam and over the longitudinal length of the load beam in a way to increase lateral stiffness and torsional stiffness. To increase lateral stiffness, a wider and/or thicker region is provided near the actuator mounting side of the load beam, while torsional stiffness is enhanced by taking mass away from the outside edges in the remainder of the load beam extending toward its distal tip. A load beam top profile is defined by side edges, each providing a spring region and a proximal portion of the rigid region, a curve having a center of curvature within the load beam structure, while a more distal portion of the rigid region is defined by curves having a center of curvature outside the load beam material. Preferably, a stiffener member is provided covering at least a portion of the surface of the rigid region. The stiffener is wide where it covers the proximal portion of the rigid region for increasing lateral and torsional stiffness, and then decreases in width extending toward the distal end of the load beam.

24 Claims, 5 Drawing Sheets

HEAD SUSPENSION FOR USE WITH A DYNAMIC STORAGE DRIVE HAVING AN OPTIMIZED TOP PROFILE DEFINED BY CURVED SIDE EDGES

TECHNICAL FIELD

The present invention is directed to a head suspension for supporting a head slider within a rigid disk drive or other similar dynamic drive. More specifically, the present invention is directed to a head suspension with a modified top profile for improving both lateral bending and torsional resonance characteristics.

BACKGROUND OF THE INVENTION

Information storage devices typically include a head for reading and/or writing data onto the storage medium, such as a disk within a rigid disk drive. An actuator mechanism is used for positioning the head at specific locations or tracks in accordance with the disk drive usage. Linear and rotary actuators are known based on the manner of movement of the head. Head suspensions are provided between the actuator and the head and support the head in proper orientation relative to the disk surface.

In a rigid disk drive, head suspensions are provided which support a read/write head to "fly" over the surface of the rigid disk when it is spinning. Specifically, the head is typically located on a slider having an aerodynamic design so that the slider flies on an air bearing generated by the spinning disk. In order to establish the fly height, the head suspension is also provided with a spring force counteracting the aerodynamic lift force.

A head suspension of the type used in a rigid disk drive comprises a load beam and a flexure to which the slider is to be mounted. Load beams normally have an actuator mounting portion, a rigid section, and a spring region between the actuator mounting region and the rigid section for providing the aforementioned spring force. The flexure is provided at the distal end of the load beam to which the slider is mounted and permits pitch and roll movements of the slider to follow disk surface fluctuations. Flexures are known that are integrated into the design of the load beam and those formed as a separate element fixed to the rigid region of the load beam.

In providing the spring force to the rigid section of the load beam for counteracting the aerodynamic lift force against a slider, a preformed bend or radius is made in the spring region of the load beam. The radius provides the spring force and thus a desired gram loading to the slider for a predetermined offset height, the offset height being a measurement of the distance between the mounting height of the head suspension and the slider at "fly" height. Constraints of the drive design, including the spacing of the disks within the drive, factor into the predetermined offset height. In any case, the gram load at the offset height provides the counteracting force to the aerodynamic lift force to establish the "fly" height of the slider above a disk surface. As used hereinafter, the term "loaded" head suspension means the head suspension combined with the slider at "fly" height and in equilibrium under the influence of the aerodynamic lift force and the oppositely acting spring force.

The radius area of the spring region is not only responsible for loading, but has also been determined to have a large impact on torsional resonance characteristics of the head suspension. Resonance frequencies of the head suspension, if not controlled, can lead to off-track error within such a disk drive. Head suspensions are designed to optimize performance even at resonance frequencies, which include a lateral bending mode and torsional modes. More particularly, it is a design criteria to increase certain resonance frequencies to be higher than the vibrations experienced in the disk drive application. Additionally, it is desirable to reduce or eliminate the movement or gain of the head at the resonance frequencies of the head suspension.

Torsional and lateral bending modes are beam modes that are dependent on cross-sectional properties along the length of the load beam. These modes also result in lateral movement of the slider at the end of the head suspension assembly. Torsional modes sometimes produce a mode shape in which the tip of the resonating head suspension assembly moves in a circular fashion. However, since the slider is maintained at an offset height by the stiffness of the applied spring force, only lateral motion of the rotation is seen at the slider. The lateral bending mode (often referred to as "sway") is primarily lateral motion.

The lateral bending mode is normally controlled by the design of the cross-section of the load beam, i.e., side rails, channels, and the like. It is typically desirable to control the resonance frequency of the lateral bending mode so that it is higher than the frequencies that are experienced in the disk drives within which they are to be used.

Torsional modes, however, typically occur at lower frequencies, but typically have less of a lateral effect. Torsional modes are further subdivided depending on the number, if any, of nodes present along the length of the suspension assembly between a fixed end thereof and its free end. The slider would be supported near the free end. These various torsional mode shapes occur at different resonance frequencies. A single twist of the head suspension between a fixed end and its free end is referred to as first torsion mode. The off-track motion at the first torsion resonance frequency is the first torsional gain. Second torsional mode means a torsional mode shape having a single node along the length suspension between its fixed end and its free end. The position of the node divides the head suspension into first and second twisting motions on either side of the node point. Second torsional resonance frequencies occur at higher frequencies than the first torsional mode. Higher order torsional modes, i.e., third torsional mode having two node points, etc., typically occur at frequencies higher than those experienced within a typical disk drive environment.

The mass of the head suspension and how that mass is distributed along the head suspension has a large impact on the head suspension resonance frequencies and gain characteristics. For example, the addition of mass at a location of maximum displacement for a particular mode (bending or torsional) will generally reduce the natural frequency. Moreover, the lowering of the natural frequency may also increase the gain. To complicate matters, mass added at a specific location may advantageously increase lateral stiffness and thus the lateral bending mode resonance frequency, for example, but at the same time have a negative effect on a torsional resonance frequency.

To provide a high lateral bending frequency, the head suspension needs to be stiff in both the lateral direction and torsionally along the entire length of the head suspension. If a head suspension is designed with only one of these conditions in mind, the head suspension may have a low resonance frequency of torsional or lateral bending with a high degree of off-track motion or gain. A head suspension having a high lateral stiffness but a low torsional stiffness, will not move strictly laterally due to the high lateral stiffness, but may twist at a lower resonance frequency. If the head suspension has high torsional stiffness and low lateral stiffness, the head suspension may deflect primarily laterally at a lower resonance frequency.

As an example, a wide head suspension load beam is described in U.S. Pat. No. 4,992,898 to Wanlass. The relatively wide and evenly spaced side edges of the Wanlass design provide a load beam having a relatively high lateral stiffness. However, this increase is at the expense of torsional stiffness, which without further compensating features would tend to reduce the resonance frequency of the torsional and sway modes.

An example of a head suspension load beam shape designed primarily to increase torsional resonance frequencies is shown in U.S. Pat. No. 5,027,240 to Zarouri et al. In this case, mass is reduced significantly along the length of the head suspension to increase its torsional stiffness. However, this decrease in mass along the head suspension length has a negative effect in lateral stiffness. Again, while one stiffness is increased, the other is reduced.

SUMMARY OF THE PRESENT INVENTION

The present invention overcomes the shortcomings and disadvantages of the prior art by providing a load beam for a head suspension having high lateral and torsional stiffness across the entire length of the load beam to assure high lateral bending and torsional resonance frequencies.

More specifically, the present invention utilizes an optimized top profile (the profile of the load beam as defined by its side edges and viewed as a top or bottom plan view) for increasing lateral and torsional stiffnesses. By the present invention, mass is distributed transversely of the load beam and over the longitudinal length of the load beam in a way to increase lateral stiffness and torsional stiffness. More specifically, the top profile comprises a hybridization of optimum top profiles before lateral and torsional stiffnesses. To increase lateral stiffness, a wider and/or thicker region is provided near the actuator mounting side of the load beam, while torsional is enhanced by taking mass away from the outside edges in the remainder of the load beam extending toward its distal tip.

In accordance with one aspect of the present invention, the aforementioned advantages are achieved by a load beam for a head suspension having an actuator mounting region, a rigid region toward the distal tip of the load beam, and a spring region between the actuator mounting region and the rigid region, wherein the load beam top profile is defined by side edges, each side edge comprising a compound curve. More specifically, at the spring region and a proximal portion of the rigid region, each side edge is defined by a curve having a center of curvature within the load beam structure, while a more distal portion of the rigid region is defined by a curve having a center of curvature outside the load beam material. Preferably, the spring region and proximal portion of the rigid region as defined by the first curve are wider than the actuator mounting region.

In accordance with another aspect of the present invention, a load beam for a head suspension is provided that comprises an actuator mounting region, a rigid region, and a spring region between the actuator mounting region and the rigid region, wherein a stiffener member is provided covering at least a portion of the surface of the rigid region, the stiffener having a top profile defined by side edges for increasing both lateral and torsional stiffness of the load beam. Preferably, the stiffener is wide where it covers the proximal portion of the rigid region for increasing lateral and torsional stiffness, and then decreases in width extending toward the distal end of the load beam. More preferably, the stiffener is flared wider at locations where torsional stiffness is required, such as at the node point locations of the torsional mode shapes.

In accordance with yet another aspect of the present invention, a load beam for a head suspension is provided that includes a load beam having a top profile defined by side edges, each having a compound curve to provide a wider spring and proximal portion of the rigid region with a narrower distal end, and in combination with a stiffener also having a top profile optimized to increase lateral and torsional stiffnesses.

DETAILED DESCRIPTION OF THE PREFERRED EMBODIMENTS

Figure 1:
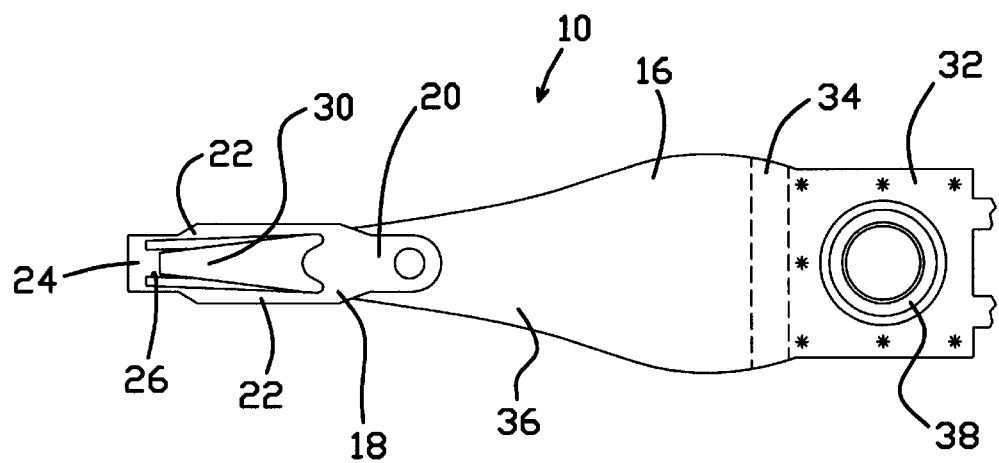
FIG. 1 is a top plan view of a head suspension assembly with accordance with the present invention.
Figure 2:
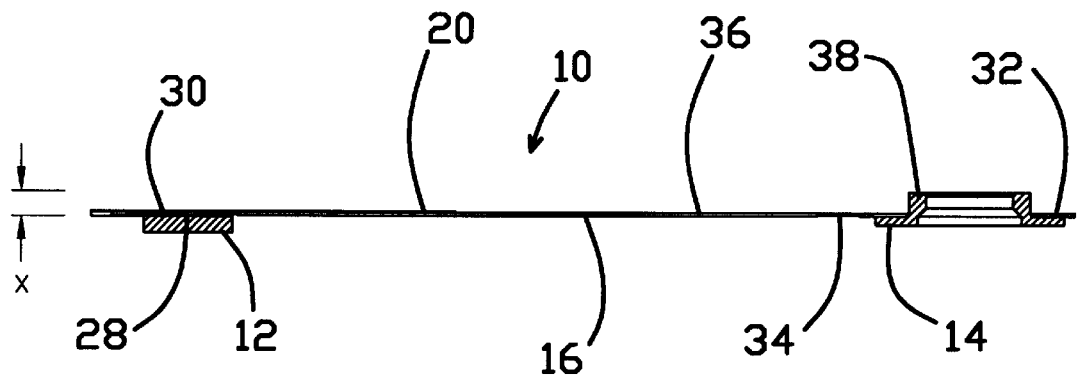
FIG. 2 is a longitudinal cross-sectional view taken along line 2—2 in FIG. 1 of a head suspension assembly in accordance with the present invention.

With reference to the attached Figures wherein like components are designated with like numerals throughout the several Figures, and initially to FIGS. 1 and 2, a head suspension 10 is illustrated combined with a conventional slider 12 and a baseplate 14. Slider 12 would conventionally include a read/write head (not shown) for data storage and retrieval to the surface of a rotating magnetic storage disk (not shown) within a rigid disk drive (not shown). The head suspension 10 is to be connected with an actuator (not shown) via the baseplate 14 for locating the slider 12 over the surface of a storage disk. In a rigid disk drive, the slider 12 is aerodynamically designed so that an air bearing generated by the surface of the rotating disk causes the slider 12 to fly over the surface of the disk. The present invention is particularly directed to head suspensions of the type used in rigid disk drives; however, it is contemplated that the advantages of the present invention are applicable to other dynamic drives, magnetic, optical, or the like, as well as to contact drives where the slider contacts a disk surface during operation.

Head suspension 10 comprises a load beam 16 and a flexure 18. The illustrated flexure 18 is a separately formed element and is conventionally connected with the load beam 16, such as by welding, for supporting the slider 12 while facilitating pitch and roll movements of the slider 12 during use within a disk drive. Flexure 18 comprises a mounting portion 20, a pair of spring arms 22, a cross piece 24 and a cantilever portion 26. The illustrated flexure version 18 is an interleaved design wherein the mounting portion 20 is mounted to a first surface of the load beam 16 while the cantilever portion 26 is provided over a portion of the opposite surface of the load beam 16. This design is the subject matter of copending and commonly assigned U.S. patent application Ser. No. 08/772,353 filed Dec. 23, 1996, the entire disclosure of which is hereby incorporated for reference. By virtue of the spring arms 22, the cantilever portion 26 is biased against a load point dimple 28 extending from a distal tip portion 30 of the load beam 16. In the preferred embodiment, the dimple 28 is made by providing a partially etched thickness portion on the distal tip portion 30, whereby the dimple 28 is formed by etching the material around it.

Instead of a separately formed flexure 18, integrally made flexures are also well known. Specifically, instead the flexure may be formed integral with the material of the load beam 16 for supporting the slider 12 and permitting its pitch and roll movements during usage. Other separately formed flexures are also usable in accordance with the present invention.

Load beam 16 comprises an actuator mounting region 32, a spring region 34, and a rigid region 36 leading to the distal tip 30. The actuator mounting region 32 is conventionally secured to the baseplate 40, such as by welding, and includes an opening through which a collar 38 that is fixed with the baseplate 14 extends. The collar 38 facilitates attachment to an actuator assembly (not shown).

The spring region 34 is provided between the actuator mounting region 32 and the rigid region 36 for providing a predetermined load to the distal tip 30 of the load beam 16 and thus to the slider 12. This spring force is utilized to offset the lift force generated by the action of the air bearing of a disk surface and the slider 12 and to define the offset height X which defines the fly height of slider 12 above the disk surface during use. The spring region 34 typically includes a bend or radius that generates the spring force. FIG. 2 illustrates the head suspension 10 in a loaded state at fly height. Also according to the illustrated embodiment, the spring region 34 comprises a partial thickness region, wherein such a bend or radius can be provided. An advantage of providing a partial thickness spring region 34 is that the rigid region 36 can comprise the full thickness material which is substantially more rigid than the remaining material of the spring region 34.

As discussed above in the Background section, it is desirable to design head suspensions with improved characteristics relating to natural frequencies in both lateral bending and torsional modes. The lateral bending mode, hereinafter referred to as "sway" typically represents the upper end of the frequency operating range of a disk drive. This is because the sway mode usually results in too high a degree of off track motion or gain. A high sway natural frequency requires the head suspension to be stiff in both the lateral direction and torsionally along the length of the head suspension. By the present invention, the top profile of the load beam 16 is utilized to increase the sway resonance frequency while preserving the torsional resonance frequencies.

Figure 3:
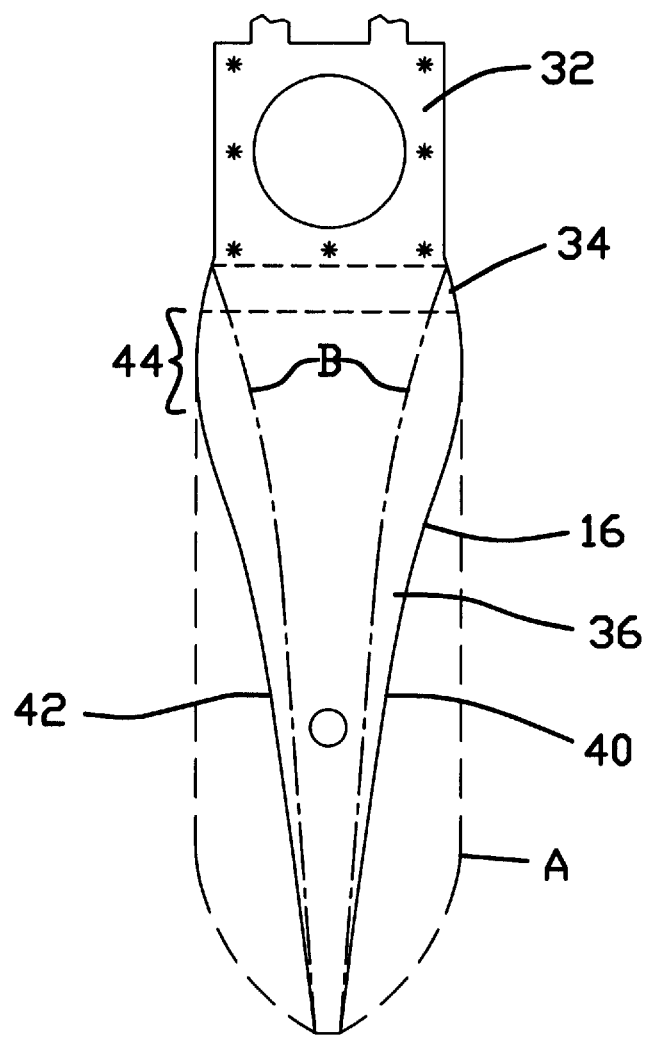
FIG. 3 is a top plan view of a load beam for the head suspension of the present invention.
Figure 4:
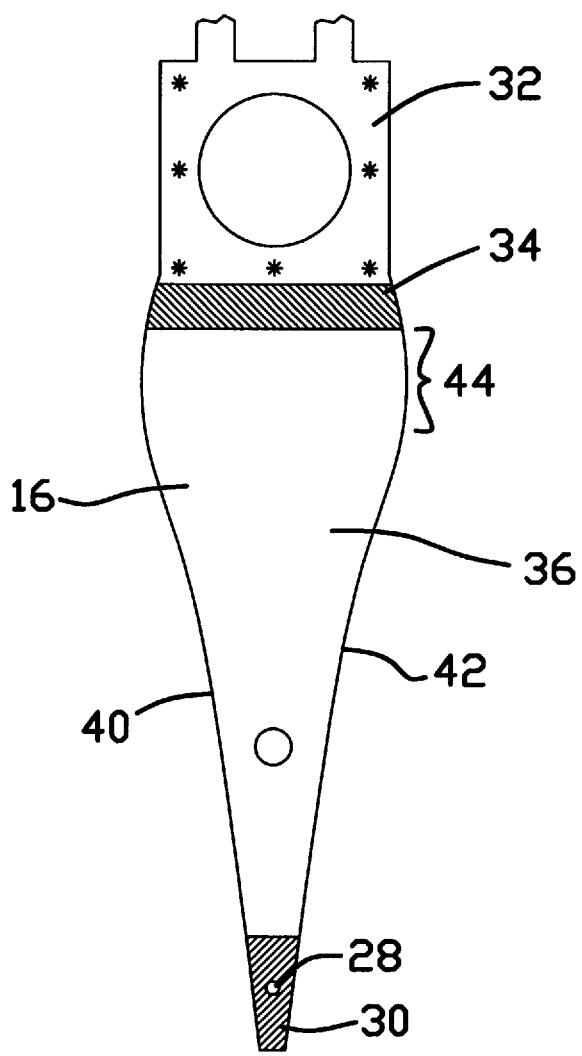
FIG. 4 is a bottom plan view of a load beam for a head suspension in accordance with the present invention.

With reference to FIGS. 3 and 4, the top profile of load beam 16 is illustrated. More specifically, it is the top profile as defined by the spring region 34 and the rigid region 36 that is important. The actuator mounting region 32 is conventionally designed for its ability to be connected with an actuator. Since this area is typically clamped during use, its shape is not particularly material to lateral or torsional stiffnesses. By the term "top profile", it is meant the profile of the load beam 16 as viewed in either the top or bottom plan views, FIGS. 3 and 4 respectively, as defined by first and second side edges 40 and 42. FIG. 4 also clearly illustrates the partial thickness spring region 34 and the partial thickness distal tip portion 30 from which the load point dimple 28 extends.

FIG. 3 illustrates not only the top profile of the load beam 16, but also shows a first phantom shape defined by the dashed line A which is more ideally shaped for increasing lateral stiffness to increase the sway mode resonance frequency. Dashed line A illustrates a two-dimensional shape determined to be ideal for a flat load beam 16; however, an ideal three-dimensional shape would be bullet-shaped. A second phantom shape is also illustrated by chain lines B. This second shape has been determined to be more ideal for increasing torsional stiffness and thus increasing the resonance frequency of the torsional modes. Again, the illustrated shape is applicable to a two-dimensional load beam structure with the understanding that an ideal three-dimensional shape would be shaped similar to a golf tee.

The shape indicated by dashed line A defines a relatively wide spring region and rigid region of a load beam that slightly tapers continually toward the distal tip thereof. The effect is to increase lateral stiffness over the entire cross section of the load beam. As to the shape defined by chain lines B, a relatively narrow load beam structure is defined tapering quickly from the actuator mounting region. The effect is to reduce mass at the edges away from the axis of rotation of the torsional modes so as to increase torsional stiffness and the resonance frequencies of the torsional modes.

The top profile of load beam 16 illustrated in FIG. 3 is thus a hybrid of the shapes defined for the optimal lateral and torsional stiffnesses. That is, the load beam 16 is relatively wider at the spring region 34 and a proximal portion 44 of the rigid region 36. From there distally, the load beam 16, specifically within the rigid region 36, narrows quickly. The wider portion at the spring region 34 and proximal rigid region portion 44 enhance lateral stiffness. Moreover, this is the area of the load beam 16 that is most affected by an increase in lateral stiffness. Sway resonance frequency is increased, and gain may be reduced.

On the other hand, the remaining portion of the rigid region 36 distally therefrom is more optimized for torsional stiffness. It is this more distal region that is more affected by the torsional modes. The reduction in mass away from the torsional axis of rotation in this region increases its torsional stiffness and resonance frequency. The hybrid shape of load beam 16 is a result of the trade-off between torsion and sway resonance characteristics. However, the shape is optimized in that lateral stiffness is increased at the location where it is most effective while the torsional stiffness is also increased at the location where it is most effective.

Side edges 40 and 42 define the top profile in accordance with the above, and each side edge 40 and 42 is preferably characterized as a compound curve. That is, the side edges 40 and 42 within the spring region 34 and proximal rigid region portion 44 each define a first curve having a center of curvature within the material of that portion of the load beam 16. Beyond the proximal rigid region portion 44, each edge 40 and 42 is curved in the opposite direction defining a center of curvature that lies outside the material of the load beam 16. Beyond this second curve, the load beam 16 is preferably tapered gradually toward the distal tip 30.

The first curves together define a wider portion of the load beam, preferably encompassing the spring region 34 and the proximal rigid region portion 144. Preferably, this under portion is the widest region of the load beam 16. Moreover, the first curves preferably lead directly into the second curves to provide the quick narrowing of the remainder of the load beam 16.

Figure 5:
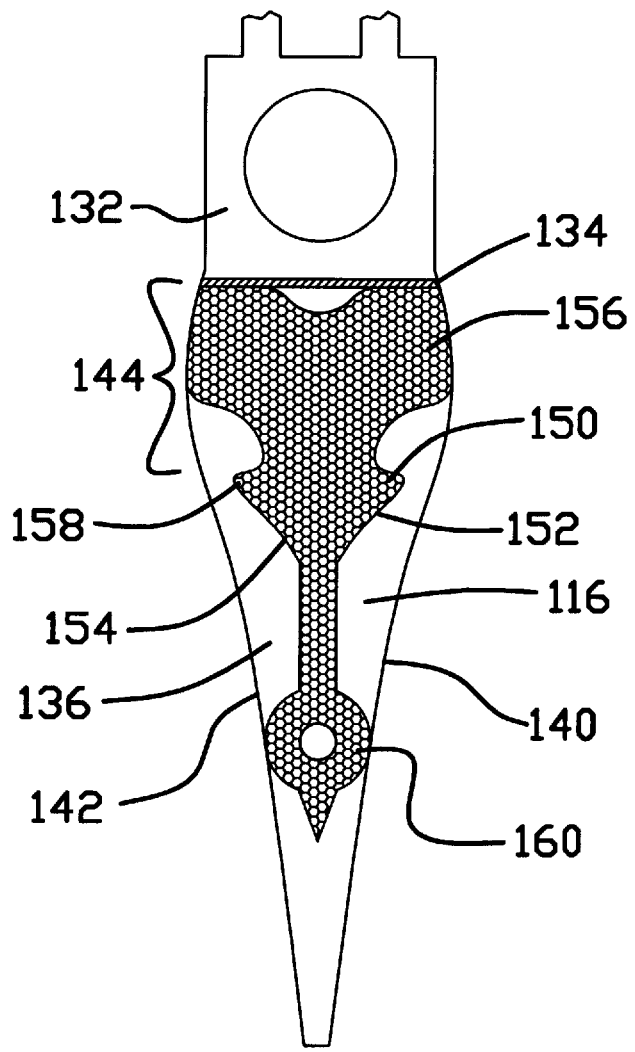
FIG. 5 is a top plan view a load beam including a stiffener element for a second embodiment of a head suspension in accordance with the present invention.

Referring now to FIG. 5, a further improvement is applied to a load beam 116 that is substantially similar to load beam 16 described above. Specifically, a stiffener 150 is provided on at least one surface of the load beam 116. Like the top profile of the load beam 116, the stiffener 150 is also optimized to enhance both lateral and torsional stiffnesses.

Load beam 116 is substantially similar to load beam 16, described above, except that the spring region 134 is substantially shorter in the longitudinal direction of the load beam 116. The spring region 134 functions basically the same as the spring region 34 but requires a more distinct bend or crease to provide the spring force within the spring region 134. The advantage of a shorter spring region 134 is the additional area for increasing lateral stiffness in the proximal portion 144 of the rigid region 136.

The stiffener 150 can comprise any material that increases the overall stiffnesses of the load beam 116 and may be secured to the surface of the load beam 116 by any conventional technique including the use of adhesives, welds, and the like. Moreover, the stiffener 150 may comprise an elastomeric material to function more as a damping element in addition. Stiffener 150 may also comprise plural layers, with separate layers optimized for different or the same stiffnesses.

Load beam 116 is defined by side edges 140 and 142, preferably in the same manner described above before load beam 16. Stiffener 150 likewise has a top profile defined by side edges 152 and 154. The stiffener 150, as illustrated, includes a wide proximal portion 156 that preferably has its side edges that follow the first curves of the side edges of the load beam 116 at its proximal portion 144 to overlie that portion. Portion 156 thus increases lateral stiffness by its width and also increases overall lateral and torsional stiffness by the additional thickness near the actuator mounting region 132. The thicker the stiffener at portion 156, the better the increase in lateral and torsional stiffness. The remainder of the stiffener 150 distally from portion 156 is generally narrower in the transverse direction for torsional stiffness. This remaining portion of stiffener 150 is preferably substantially more narrow than the rigid region 136. However, the stiffener flares out at portions 158 and 160 where additional torsional stiffness is required. More specifically, the locations where additional torsional stiffness is desirable are those high strain energy locations of the torsional modes. The high strain energy locations are primarily the nodes of the second order and higher torsional modes. However, to keep the overall mass of the part to a minimum, the torsional stiffness is only increased at these high strain energy locations resulting from the particular mode. The points of high strain energy and thus the side edge profile can be determined empirically or by any quantitative analysis such as finite element analysis.

Many other modifications are contemplated for further improving lateral and torsional stiffnesses. For example, a second stiffener may be provided to the opposite side of the load beam 116. Moreover, the stiffener 150 may be varied in thickness throughout. That is, the stiffener may be thicker in its proximal portion 156, for example, or along its center longitudinal axis. Other three dimensional features may be applied consistent with the above.

Furthermore, it is contemplated that conventional stiffening rails can be added along the side edges 40 and 42 or 140 and 142. Furthermore, box beam structures can be incorporated within the load beam design, such as taught and described in copending and commonly assigned U.S. patent application Ser. No. 08/775,831 filed Dec. 31, 1996, the entire disclosure of which is incorporated herein by reference. Such a box beam structure can be incorporated by providing one or more partial thickness regions within the material of the load beam 116, for example, and which are covered by a portion of the stiffener 150 or by other structures. Such box beam or monocoque structures increase torsional stiffness while reducing mass.

I claim:

1. A load beam for a head suspension for use within a dynamic storage drive, said load beam formed from a sheet of material and comprising:

an actuator mounting region for attachment to an actuator of a dynamic storage drive;

a rigid region distally from said actuator mounting region leading toward a distal tip of said load beam; and a spring region between said actuator mounting region and said rigid region for providing a spring force to said distal tip;

wherein said load beam has a top profile defined by side edges, and each side edge defines a first curve having a center of curvature within the material of the load beam and a more distal second curve having a center of curvature outside of the material of the load beam.

2. The load beam of claim 1, wherein said first curves of said side edges define a wider portion of said load beam in the transverse direction of said load beam, and said wider portion comprising at least a portion of said spring region and a proximal portion of said rigid region.

3. The load beam of claim 2, wherein said wider portion of said load beam is wider in the transverse direction of said load beam than any other portion.

4. The load beam of claim 3, wherein said second curves of said side edges define a narrow portion of said load beam in the transverse direction of said load beam, and said narrow portion comprises a portion of said rigid region.

5. The load beam of claim 4, wherein said first curves of said side edges lead directly into said second curves of said side edges.

6. The load beam of claim 5, wherein said rigid region is further defined by side edge portions extending from said second curves that gradually converge toward said distal tip.

7. The load beam of claim 6, further in combination with a flexure element connected to said distal tip of said load beam for supporting a head slider.

8. The load beam of claim 1, further comprising a stiffener covering at least a portion of said load beam for increasing lateral and torsional stiffness of said load beam.

9. The load beam of claim 8, wherein said stiffener has a top profile defined by side edges, and said stiffener comprises a proximal wide portion that overlies a proximal portion of said rigid region for increasing lateral stiffness of said load beam and a narrow portion that overlies a more distal portion of said rigid region for increasing torsional stiffness of said load beam.

10. The load beam of claim 9, wherein said wide portion of said stiffener substantially extends between portions of said first curves of said load beam within the proximal portion of said rigid region of said load beam.

11. The load beam of claim 10, wherein said narrow portion of said stiffener is substantially narrower than a narrow portion of said load beam defined between said second curves thereof.

12. The load beam of claim 11, wherein said stiffener includes at least one flared wider portion within its narrow region substantially corresponding to a node point for a second order or higher torsional mode of said load beam.

13. The load beam of claim 12, wherein said stiffener includes plural flared wider portions within its narrow region substantially corresponding to node points for second order and higher torsional modes of said load beam.

14. A load beam for a head suspension for use within a dynamic storage drive, said load beam formed from a sheet of material and comprising:

an actuator mounting region for attachment to an actuator of a dynamic storage drive;

a rigid region distally from said actuator mounting region leading toward a distal tip of said load beam;

a spring region between said actuator mounting region and said rigid region for providing a spring force to said distal tip; and a stiffener covering at least a portion of said load beam for increasing lateral and torsional stiffness of said load beam, wherein said stiffener has a top profile defined by side edges, and said stiffener comprises a proximal wide portion that overlies a proximal portion of said rigid region for increasing lateral stiffness of said load beam and a narrow portion that overlies a more distal portion of said rigid region for increasing torsional stiffness of said load beam wherein said narrow portion is substantially narrower than a narrow portion of said load beam defined between side edges of said load beam.

15. The load beam of claim 14, wherein said wide portion of said stiffener substantially extends between portions of sides edges of said load beam within a proximal portion of said rigid region of said load beam.

16. The load beam of claim 15, wherein said stiffener includes at least one flared wider portion within its narrow portion substantially corresponding to a node point for a second order or higher torsional mode of said load beam.

17. The load beam of claim 16, wherein said stiffener includes plural flared wider portions within its narrow region substantially corresponding to node points for second order and higher torsional modes of said load beam.

18. The load beam of claim 14, wherein said load beam has a top profile defined by side edges, and each side edge defines a first curve having a center of curvature within the material of the load beam and a more distal second curve having a center of curvature outside of the material of the load beam.

19. The load beam of claim 18, wherein said first curves of said side edges define a wider portion of said load beam in the transverse direction of said load beam, and said wider portion comprising at least a portion of said spring region and a proximal portion of said rigid region.

20. The load beam of claim 19, wherein said wider portion of said load beam is wider in the transverse direction of said load beam than any other portion.

21. The load beam of claim 20, wherein said second curves of said side edges define a narrow portion of said load beam in the transverse direction of said load beam, and said narrow portion comprises a portion of said rigid region.

22. The load beam of claim 21, wherein said first curves of said side edges lead directly into said second curves of said side edges.

23. The load beam of claim 22, wherein said rigid region is further defined by side edge portions extending from said second curves that gradually converge toward said distal tip.

24. The load beam of claim 23, further in combination with a flexure element connected to said distal tip of said load beam for supporting a head slider.

* * * * *